(12) United States Patent
Erickson et al.

(10) Patent No.: US 6,558,726 B2
(45) Date of Patent: May 6, 2003

(54) COFFEE BEAN ROASTING APPARATUS

(75) Inventors: Chad S. Erickson, Plymouth, MN (US); Wesley C. Drumm, Manitowoc, WI (US)

(73) Assignee: The Metal Ware Corporation, Two Rivers, WI (US)

( * ) Notice: Subject to any disclaimer, the term of this patent is extended or adjusted under 35 U.S.C. 154(b) by 0 days.

(21) Appl. No.: 09/967,820

(22) Filed: Sep. 28, 2001

(65) Prior Publication Data

US 2003/0061942 A1 Apr. 3, 2003

(51) Int. Cl.[7] .................. A23N 12/00; A47J 37/00
(52) U.S. Cl. .................. 426/466; 34/371; 34/576; 34/586; 34/591; 99/323.5; 99/474; 99/483; 426/467
(58) Field of Search .................. 426/466, 467, 426/520; 99/286, 323.5, 474, 483; 34/233, 371, 576, 586, 591

(56) References Cited

U.S. PATENT DOCUMENTS

| | | | |
|---|---|---|---|
| 4,271,603 A | 6/1981 | Moore, III |
| 4,325,191 A | 4/1982 | Kumagai et al. |
| 4,698,916 A | 10/1987 | Färber |
| 4,860,461 A | 8/1989 | Tamaki et al. |

(List continued on next page.)

OTHER PUBLICATIONS

Material on Hearthware Coffee Roaster published at: http://www.wholelattelove.com/forms/hearthware.htm.
Material on Hearthware Precision Coffee Roaster published at: http://www.sweetmarias.com/prod.hearthware.shtml.
Hearthware Precision Roaster Tip Sheet published at: http://www.sweetmarias.com/hearthware.prec.tipsheet.html.
Material on The Fresh Roast Coffee Bean Roaster published at: http://www.sweetmarias.com/prod.freshroast.shtml.
Material on Alpenröst Home coffee Roaster published at http://www.Swissmar.com/alpenroast.htm.
Material on The Alpenrost Rotary Drum Home Coffee Roaster by swissmar published at: http://www.sweetmarias-.com/prod.swissmar–alpenrost.shtml.

*Primary Examiner*—George C. Yeung
(74) *Attorney, Agent, or Firm*—Godfrey & Kahn, S.C.; William K. Baxter (57) ABSTRACT

A roasting apparatus for roasting nuts, cocoa beans, coffee beans, and other small food stuffs comprising a base, a motor and afterburner assembly attached to the top of the base on one side thereof, a roasting assembly attached to the top of the base on the other side thereof, and a top cover assembly removably attached to the tops of the motor and afterburner assembly, and the roasting assembly. The apparatus further includes a blower assembly coupled to an electric motor for providing airflow through the roasting assembly, a fan coupled to the motor for providing airflow through the afterburner assembly, a drive assembly also coupled to the motor for driving an auger positioned within a roasting chamber of the roasting assembly, a roasting chamber heating assembly for heating the airflow from the blower assembly prior to entering the roasting chamber, a chaff collection assembly and filter positioned above the roasting chamber, and a digital control assembly for controlling and programming operation of the roasting apparatus. The afterburner assembly preferably includes an afterburner intake member for receiving exhaust gases from the roasting assembly, a catalyst heating element for heating the exhaust gases before entering a catalyst, and a catalyst heat shield surrounding the catalyst.

20 Claims, 7 Drawing Sheets

U.S. PATENT DOCUMENTS

| | | |
|---|---|---|
| 4,895,308 A | 1/1990 | Tanaka |
| 5,257,574 A * | 11/1993 | Hiromichi ................... 99/483 |
| 5,269,072 A | 12/1993 | Waligorski |
| 5,564,331 A | 10/1996 | Song |
| 5,718,164 A | 2/1998 | Finken et al. |
| 5,735,194 A | 4/1998 | Cochran |
| 5,749,288 A | 5/1998 | Skaling |
| D395,192 S | 6/1998 | Fischer et al. |
| 5,890,418 A | 4/1999 | Song |
| 5,902,623 A | 5/1999 | Cochran |
| 5,925,590 A | 7/1999 | White et al. |
| 5,996,480 A | 12/1999 | Kelley et al. |
| 6,051,266 A | 4/2000 | Totsuka |
| 6,053,093 A | 4/2000 | Gerhardt et al. |
| 6,112,644 A | 9/2000 | Song |
| 6,173,506 B1 | 1/2001 | Kruepke et al. |
| 6,187,353 B1 | 2/2001 | Wyman et al. |

* cited by examiner

COFFEE BEAN ROASTING APPARATUS

FIELD OF THE INVENTION

The present invention relates generally to a roasting apparatus, and more particularly to a roasting apparatus for roasting nuts, cocoa beans, coffee beans, and other small food stuffs, the roasting apparatus comprising catalytic elements and a means of mixing the nuts or beans to significantly reduce or eliminate the unpleasant odors, gases and smoke generated in the roasting process.

BACKGROUND OF THE INVENTION

Roasted coffee beans lose their freshness very quickly. However, raw green coffee beans remain fresh almost indefinitely. When raw green coffee beans are roasted to a dark brown color, the roasting gives off a very foul, pungent smell and generates smoke that would be considered unpleasant in a household environment. Most prior art household coffee bean roasting apparatus have several disadvantages, such as roasting only a small amount of coffee beans, non-uniformity in roasting, and the emission of foul odors and smoke during the roasting process. Perhaps the greatest challenge to controlling these odors is the common use of high air velocities of hot air to heat and mix the beans in prior art devices. The prior art household coffee bean roasting apparatus that use the high air velocities of hot air to generate large volumes of exhaust gases in order to "float" and circulate the beans in a similar manner to hot air popcorn poppers in order to uniformly roast the coffee beans. The coffee bean roasting apparatus of the present invention roasts a larger amount of coffee beans than the prior art, roasts the beans more uniformly, and eliminates the roasting odors and smoke associated with the roasting process.

It has long been known by commercial coffee roasting professionals and coffee enthusiasts that the smell of roasting raw coffee beans is typically regarded as unpleasant. Especially in the latter stages of roasting, the beans exude substantial quantities of oils and particulate matter as a byproduct of caramelization and pyrolysis, which can impart an unpleasant odor during roasting. Many attempts have been made to reduce or control these odors and waste gases by way of filtration, burning, and/or venting.

While some of these attempts have proved successful for commercial roasting operations, efforts to control exhaust gases in a household environment have been unsuccessful.

The filtration of exhaust gases is a problem. Given the minute particle size of coffee bean roasting exhaust gases, very fine filtration media is required to materially reduce escaping gases. Filters meeting or exceeding the Department of Energy's (DOE) High-Efficient Particulate Air (HEPA) standards are required. These filters require considerable pressurization for the exhaust gases to pass through. Therefore, the filters would require loud, powerful and expensive blowers to meet the pressurization requirements. Also, since these relatively large, expensive filters cannot be cleaned or reused, the high cost of regularly replacing these filters seriously limits their attractiveness to the average household consumer.

The combustion of exhaust gases is also a problem. Open flame combustion of exhaust gases is commonly used in commercial roasting operations. In this method, natural gas is forced into a combustion chamber where it is ignited and mixed with the roasting exhaust gases before being released into the atmosphere. Although this method is effective and popular in commercial roasting operations, it is clearly impractical for the home coffee bean roasting enthusiast. Catalytic elements similar to those found in automotive pollution control equipment have also been used in commercial coffee roasting operations, but are less popular than the open flame method, primarily due to the high cost of the precious metals used to coat the catalytic elements. The prior art household coffee bean roasters that use high air velocities of hot air generate large volumes of exhaust gases that would require very large catalytic elements to adequately burn off the exhaust gases, making them impractical for household use.

The venting of exhaust gases is a further problem. Historically this method has been the most common. However, given increasing concerns over air quality, most municipalities no longer permit commercial coffee bean roasting operations to release waste gases into the atmosphere without pretreatment. Most household coffee bean roasting apparatus have long used this method as their only option. Consequently, many coffee bean roasting devices are only used outdoors or near an open window. Needless to say, in many parts of the country roasting coffee beans near an open window or outdoors is not feasible for much of the year. Many manufacturers advise against using their product indoors unless adequate venting is available. However, many homes do not have adequate venting available. Indeed, experience has shown that most consumer kitchen vents cannot keep up with the exhaust gases generated from the typical home coffee bean roasting apparatus.

Therefore, it would be desirable to provide a roasting apparatus that roasts a larger amount of coffee beans than most prior art household devices, roasts the beans uniformly, and significantly reduces or eliminates the roasting odors and smoke associated with the roasting process.

SUMMARY OF THE INVENTION

In view of the problems associated with prior art roasting appliances, it is an object of the present invention to provide a roasting apparatus, which overcomes the drawbacks of the prior art. In particular, it is an object of the present invention to provide a roasting apparatus that significantly reduces or eliminates the unpleasant odors associated with in-home coffee bean roasting.

It is another object of the present invention to provide a roasting apparatus that provides an effective means of mixing the beans during roasting by using an auger to greatly reduce the amount of heated air required for the roasting process, while at the same time greatly reducing the amount of odiferous exhaust gases generated.

It is a further object of the present invention to provide a roasting apparatus that directs is exhaust gases from the roasting process past a collection member to capture the chaff and dust carried in the exhaust gases as they flow around the perimeter of the collection member.

It is yet another object of the present invention is to provide a roasting apparatus having a filter across the exhaust gas airflow to prevent dust and chaff from escaping the roasting chamber and clogging the catalytic elements.

It is another object of the present invention to provide a roasting apparatus that channels the exhaust gases through a second heating element to elevate the exhaust gas temperature to over 700 degrees Fahrenheit to provide proper operating temperatures to the catalytic elements.

It is a further object of the present invention to provide a roasting apparatus that channels the exhaust gases through catalytic elements to burn off particulates, smoke, oils or other materials contained in the exhaust gases.

Additionally, it is an object of the present invention to provide a roasting apparatus that mixes the heated exhaust gases with room temperature air prior to expelling the combined air stream from the roasting apparatus, thereby preventing heat damage to the operator or other objects in the environment. These and other objects are met by the roasting apparatus of the present invention.

The present invention is directed to a roasting apparatus, such as a coffee bean roasting apparatus, for roasting granular material, such as nuts, cocoa beans and coffee beans. The roasting apparatus includes a base, a motor and afterburner assembly attached to the top of the base on one side thereof, a roasting assembly attached to the top of the base on the other side thereof, and a top cover assembly removably attached to the tops of the motor and afterburner assembly and the roasting assembly.

Preferably mounted within the base of the roasting apparatus is a blower assembly coupled to an electric motor for providing airflow through the roasting assembly, a drive assembly also coupled to the motor for driving an auger positioned within a roasting chamber of the roasting assembly, a roasting chamber heating assembly for heating the airflow from the blower assembly prior to entering the roasting chamber, and a digital control assembly for controlling and programming operation of the roasting apparatus.

The motor and afterburner assembly preferably includes the electric motor for driving the auger, and for driving a blower within the blower assembly and for driving a fan positioned at the opposite end of the motor from the blower for providing airflow through the afterburner assembly. The afterburner assembly preferably includes an afterburner intake member for receiving exhaust gases from the roasting assembly, a catalyst heating element for heating the exhaust gases before entering a catalyst, and a catalyst heat shield surrounding the catalyst.

The roasting assembly preferably includes a roasting chamber heating assembly positioned within the base for heating the airflow from the blower assembly prior to entering the roasting chamber, the removable roasting chamber and auger, and a chaff collection assembly positioned on top of the roasting chamber.

The removable top cover assembly preferably includes an open channel formed between an upper heat shield and a lower heat shield for allowing exhaust gases and smoke to flow from the roasting chamber into the afterburner assembly. The top cover assembly further includes a filter for filtering out dust and chaff from the exhaust gases emanating from the roasting chamber and depositing the chaff into the chaff collection assembly on top of the roasting chamber.

During a roasting cycle of the roasting apparatus, the motor driven blower assembly supplies room temperature air to the roasting chamber heating assembly, where the air is heated to a suitable roasting temperature by an electrical heating element. Upon leaving the heating assembly, the heated air is forced upward through the porous base of the roasting chamber. As the heated air passes through the coffee beans, heat is transferred from the air to the beans thereby raising bean temperature to the desired degree of roast.

Even heating of the beans is assured by the constant agitation and exchange of the beans by the rotating auger. A gentle radius formed into the base of the roasting chamber constantly feeds a supply of beans to the base of the auger, where the beans are lifted to the top of the column of beans. Upon reaching the top of the column of beans, the beans lifted by the auger are permitted to spill out onto the top of the bean column where they are subsequently returned to the bottom of the roasting chamber by the force of gravity.

After the heated air passes through the column of beans and reaches the top of the roasting chamber, it is forced to flow around a chaff collection member; a drop in air pressure causes most of the dust and chaff to fall into the chaff collection member. Beyond the chaff collection member the smoke and exhaust gases pass through a filter, which captures any remaining dust or chaff. The exhaust gases then pass through the open channel in the top cover assembly to the afterburner assembly and into a second heating element (the catalyst heating element) which raises the exhaust gas temperature to a minimum of 700 degrees Fahrenheit before it passes through a catalyst. Heating of these gases to a minimum of 700 degrees Fahrenheit enables the catalyst to properly react with the particulate matter contained in the exhaust gases. As the exhaust gases pass through the narrow channels of the catalyst, the materials on the surface of the catalyst, such as platinum and/or palladium react with the gases thereby breaking down the particulates and gases to their odorless components. As the exhaust gases escape the catalyst, the heated air stream is mixed with room temperature air from the fan and subsequently vented to the environment.

When the beans reach the desired level of roast, the roasting cycle ends, and a cool down cycle begins. A controller in the digital control assembly shuts off the roasting heating element and increases the speed of the motor, thereby increasing the RPM of the blower, fan and auger and causing the beans to be cooled. The second heating element used to heat the exhaust gases entering the afterburner assembly and catalyst remains on until the exhaust gases escaping the roasting chamber are cooled and no longer contain odor causing smoke and particulates. When the beans have become cooled, the motor and catalyst heating element are turned off, and the roasting chamber with the roasted beans may be removed and emptied.

Various other features, objects, and advantages of the invention will be made apparent to those skilled in the art from the accompanying drawings and detailed description thereof.

DETAILED DESCRIPTION OF THE INVENTION

Figure 1:
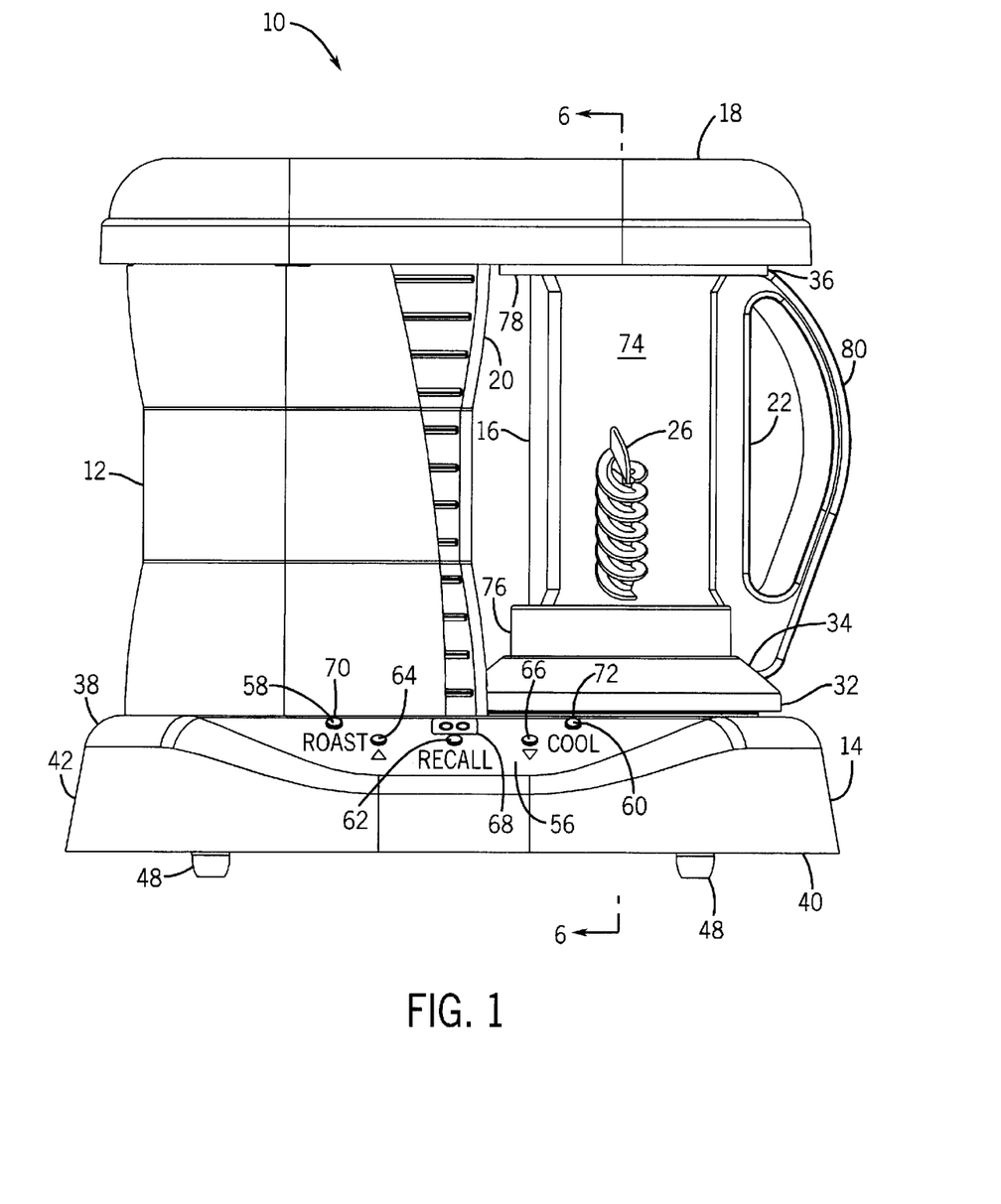
FIG. 1 is a front view of a coffee bean roasting apparatus constructed in accordance with a preferred embodiment of the present invention.
Figure 2:
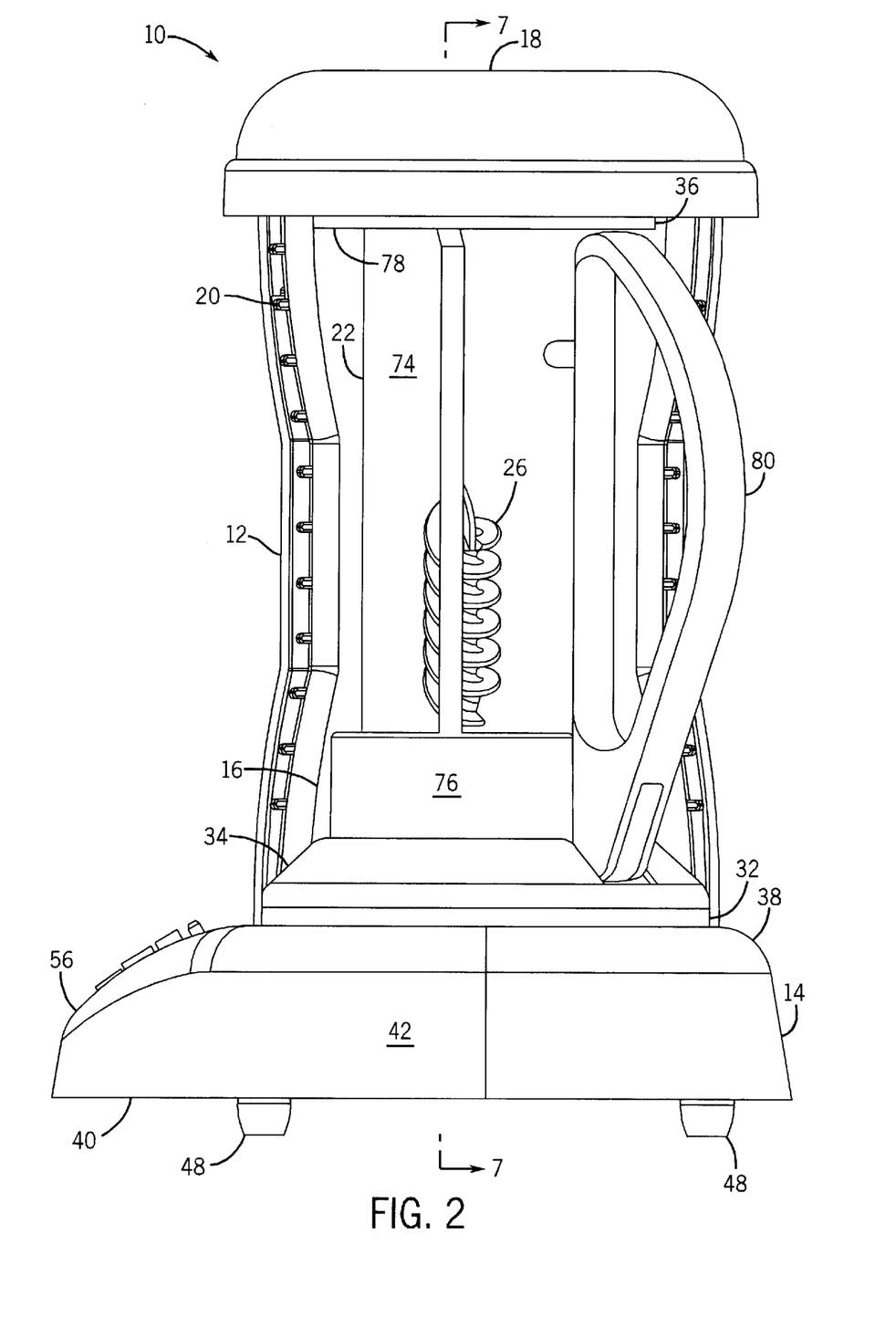
FIG. 2 is a side view of the coffee bean roasting apparatus of FIG. 1.
Figure 3:
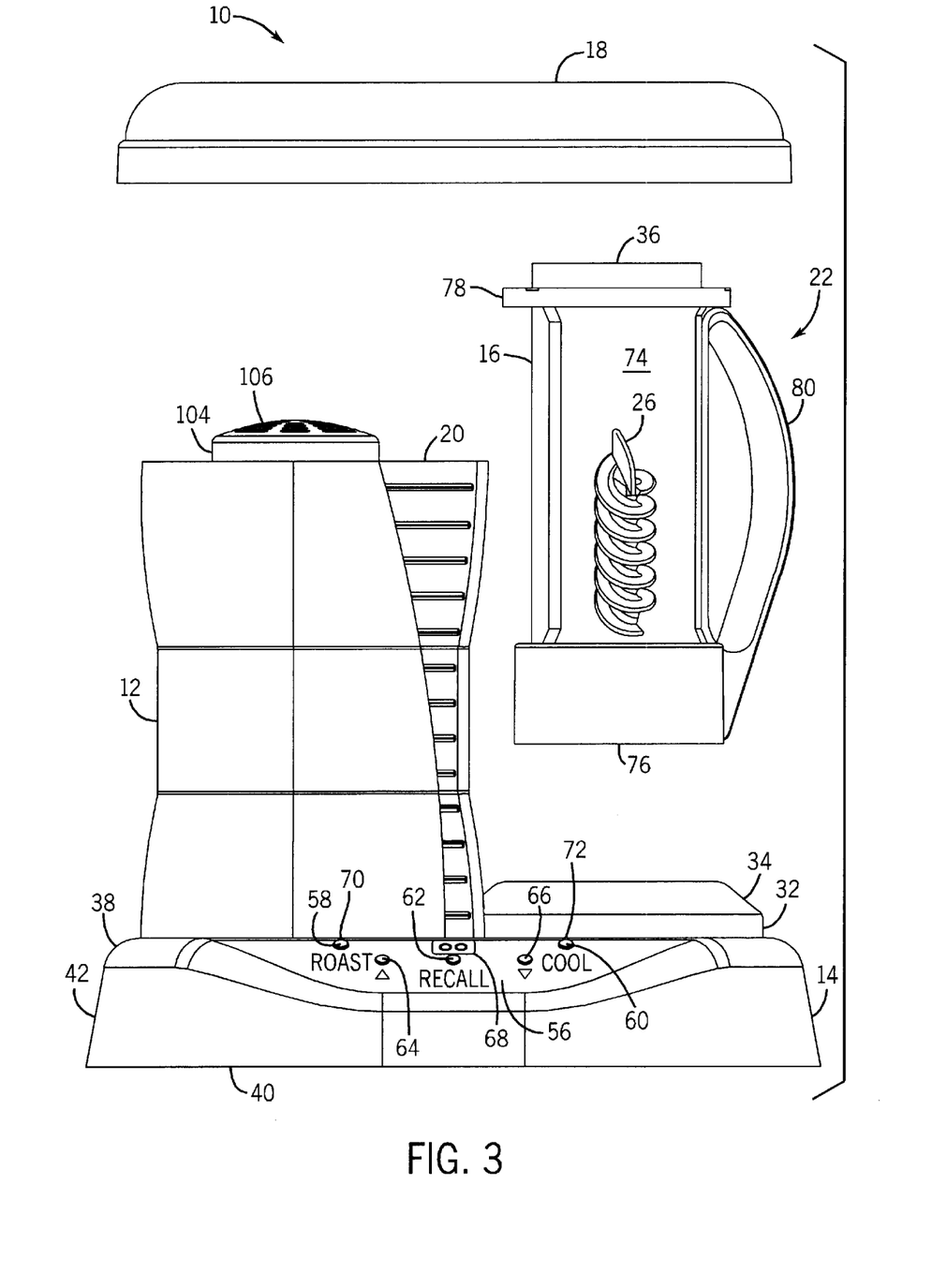
FIG. 3 is a partially exploded front view of the coffee bean roasting apparatus of FIG. 1.
Figure 7:
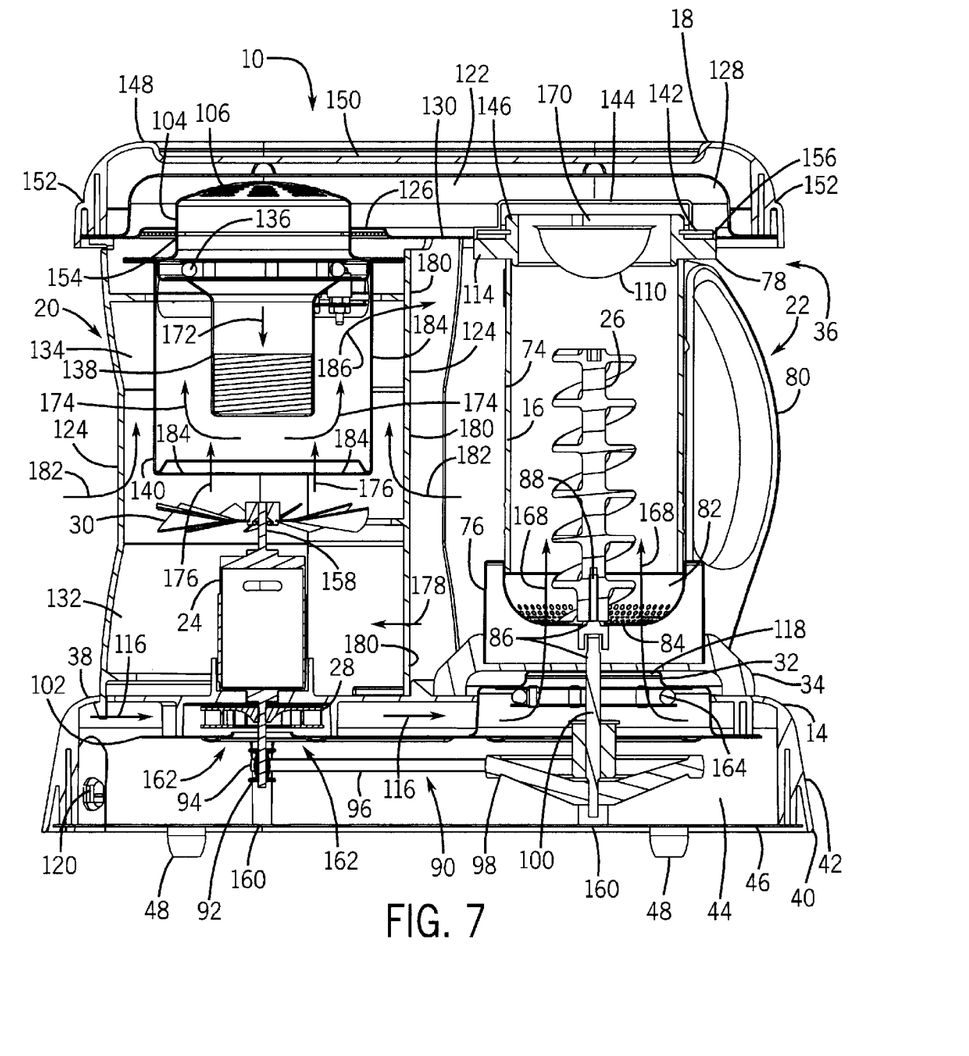
FIG. 7 is a cross-sectional view of the coffee bean roasting apparatus taken along line 7—7 of FIG. 2.

Referring first to FIGS. 1, 2 and 3, a roasting apparatus 10, such as a coffee bean roasting apparatus, for roasting granular material, such as nuts, cocoa beans and coffee beans is shown. The roasting apparatus 10 includes a main body 12 with a base 14, a removable roasting chamber 16, and a removable top cover assembly 18. The main body 12 includes a motor and afterburner assembly 20 positioned on top of the base 14 on one side thereof, and a roasting assembly 22 positioned on top of the base 14 on the other side thereof, adjacent the motor and afterburner assembly 20. The removable top cover assembly 18 covers both the motor and afterburner assembly 20, and the roasting assembly 22. The motor and afterburner assembly 20 includes a motor assembly 132 and an afterburner assembly 134 as shown in FIG. 7. The motor assembly 132 preferably includes an electric motor 24, FIG. 7, for driving an auger 26 positioned within the roasting chamber 16 of the roasting assembly 22, and for driving a blower 28 and fan 30, FIG. 7, that provide airflow through the roasting apparatus 10. The afterburner assembly 134 preferably includes an afterburner intake member 104, a catalyst heating element 136, a catalyst 138, and a catalyst heat shield 140. The roasting assembly 22 preferably includes a roasting chamber heating assembly 32 positioned within the base 14 under the roasting chamber 16, a locator ring 34 attached to the top of the base 14 above the roasting chamber heating assembly 32 for securing the removable roasting chamber 16 on the roasting chamber heating assembly 32, and a chaff collection assembly 36 positioned on top of the roasting chamber 16.

Figure 4:
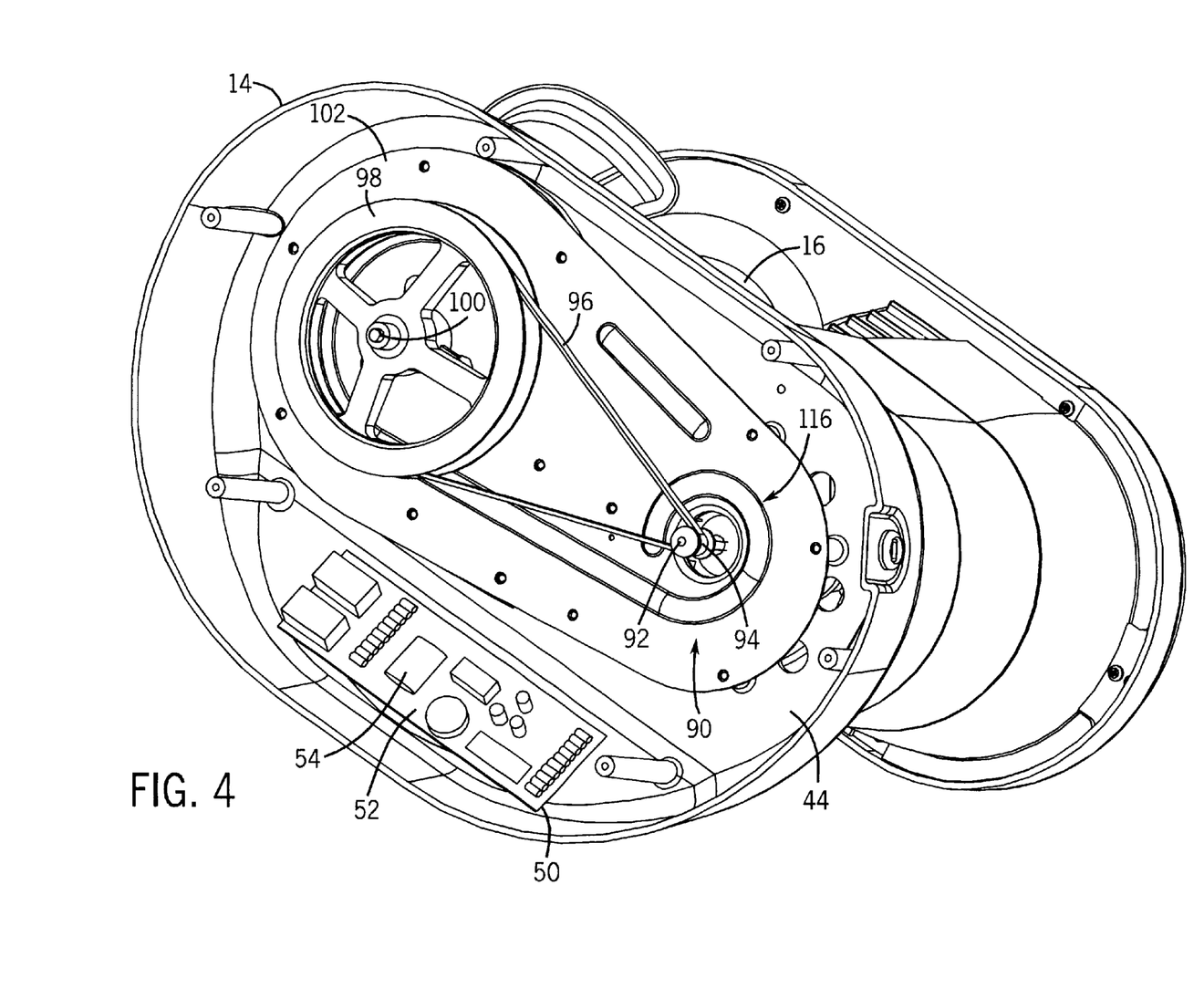
FIG. 4 is a bottom perspective view of the coffee bean roasting apparatus of FIG. 1 with the bottom cover removed.

The base 14 includes a top portion 38 and a bottom portion 40 with a sidewall 42 extending downwardly from the top portion 38 to the bottom portion 40 creating an open cavity 44, FIG. 4, within the underside of the base 14. A bottom cover 46, FIG. 7, is preferably fastened to the bottom portion 40 of the base 14 with a plurality of fasteners. Attached to the bottom cover 46 are a plurality of non-slip feet 48 for supporting the roasting apparatus 10 on a flat surface.

Figure 6:
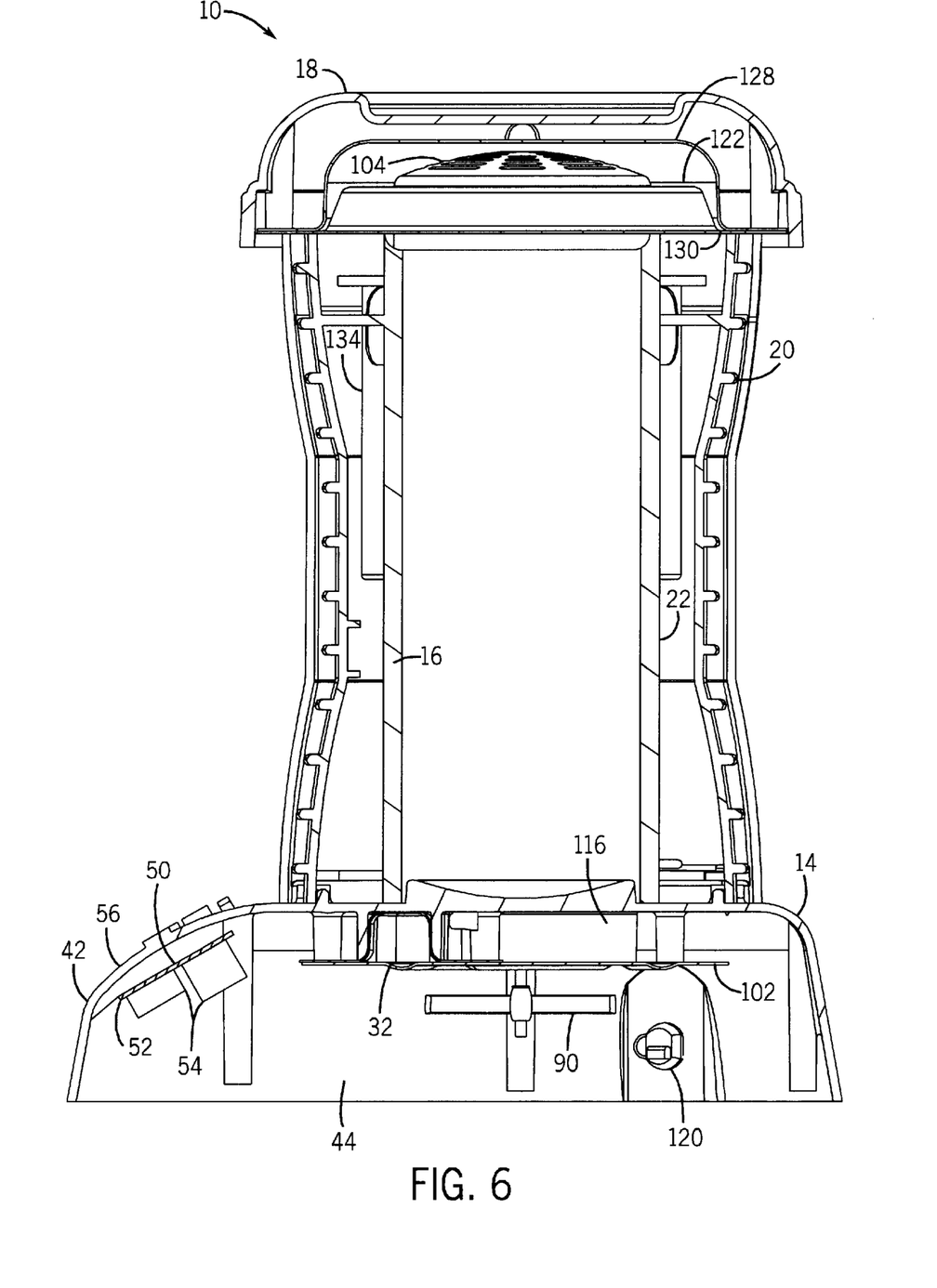
FIG. 6 is a cross-sectional view of the coffee bean roasting apparatus taken along line 6—6 of FIG. 1.

As is best shown in FIGS. 4 and 6, a digital control assembly 50 is preferably fastened to the underside of the base 14 within the open cavity 44 by a plurality of fasteners. The digital control assembly 50 includes a printed circuit board 52 with a plurality of electronic components 54 mounted thereon and a control panel 56 electrically coupled to the printed circuit board 52 and mounted on the front sidewall 42 of the base 14 for controlling and programming operation of the roasting apparatus 10. The electronic components 54 preferably include a microprocessor, a countdown timer, memory devices, such as an EEPROM, a plurality of display devices, and other associated circuitry for controlling operation of the roasting apparatus 10.

Figure 5:
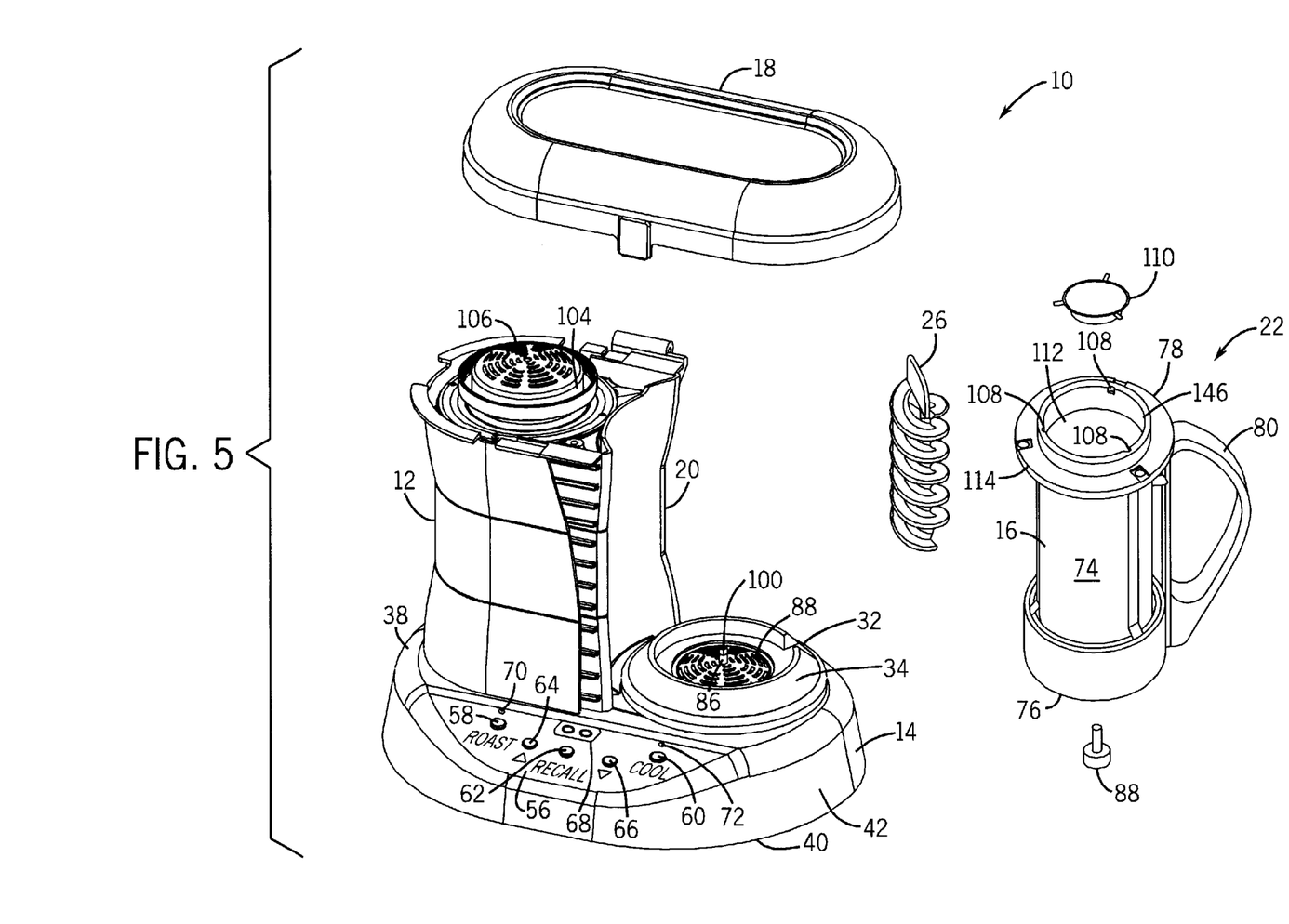
FIG. 5 is an exploded perspective view of the coffee bean roasting apparatus of FIG. 1.

As is shown in FIGS. 1, 3 and 5, the control panel 56 includes a plurality of membrane switches and/or push buttons for controlling and programming operation of the roasting apparatus 10. The switches include a ROAST push button 58 for turning on the apparatus and initiating a roasting cycle, a COOL push button 60 for initiating a cool down cycle, a RECALL push button 62 for recalling the last roasting time setting, and UP and DOWN arrow push buttons 64, 66 for programming the roasting time. In addition to the switches, the control panel 56 also includes a liquid crystal display (LCD) 68 for displaying the roasting time and a pair of light emitting diodes (LEDs) 70, 72, one LED 70 located above the ROAST push button 58 and one LED 72 located above the COOL push button 60 for indicating the status of those switches. The LCD 68 is preferably a 2-digit, 7-segment display.

Pushing the ROAST push button 58 turns the apparatus 10 on and activates the roasting cycle. The LED 70 above the ROAST push button 58 illuminates to indicate that the roasting cycle is on. The roasting cycle time is displayed on the LCD, and the countdown timer starts counting down the roasting time. The countdown timer automatically turns off power to the roasting apparatus when the programmed roasting time has expired. Once the roasting time has elapsed, the roasting apparatus 10 automatically shuts off. The roasting time may be programmed for between 15 and 25 minutes by manipulating the UP and DOWN arrow push buttons 64, 66, or by pushing the RECALL push button 62.

The UP and DOWN arrow push buttons 64, 66 program the roasting time. The LCD 68 displays the roasting time. Pushing either the UP or DOWN push buttons 64, 66 will turn the apparatus 10 on and the LCD 68 will display 15 minutes. Fifteen (15) minutes is the roasting time default. Pushing the UP arrow push button 64 increases the time by one minute per push. Twenty-five (25) minutes is the maximum roasting time. Pushing the DOWN arrow push button 66 decreases the time by one minute per push. Fifteen (15) minutes is the minimum roasting time.

Pushing the RECALL push button 62, recalls the last roasting time setting used. The time is displayed on the LCD 68. If the correct or desired time is displayed, the ROAST push button 58 can be pushed to start the roasting cycle. When the ROAST push button 58 is pushed, the time displayed on the LCD 68 is memorized in the EEPROM. Pushing the RECALL push button 62 will activate the LCD 68 if the apparatus 10 is off. The RECALL push button 62 is disabled during the roasting and cool down cycles.

Pushing the COOL push button 60 initiates the cool down cycle by turning off the roasting heating element 164 and starting the five (5) minute cool down cycle. The LED 72 above the COOL push button 60 illuminates to indicate that the cool down cycle is on. The apparatus 10 is automatically turned off after the cool down cycle is finished. The COOL push button 60 remains active at all times.

Referring next to FIGS. 3 and 5, the roasting chamber 16 preferably includes a transparent cylindrically-shaped sidewall 74 with a cylindrically-shaped bottom member 76 attached to the bottom of the sidewall 74, a cylindrically-shaped top member 78 attached to the top of the sidewall 74, and a handle 80 attached to the sidewall 74 and bottom member 76 for removing and replacing the roasting chamber 16 within the locator ring 34 attached to the top of the roasting chamber heating assembly 32. The bottom member 76 includes a roasting chamber base 82 with a plurality of slotted openings 84, FIG. 7, extending therethrough for allowing heated air to flow through the roasting chamber 16. The bottom member 76 and roasting chamber base 82 include openings 86 extending through the center thereof for accepting a shaft 100, FIG. 7, coupled to a driven pulley 98 and connecting to a coupling 88 for mounting the auger 26 thereto. The top of the roasting chamber heating assembly 32 also includes a plurality of slotted openings 118 extending therethrough for allowing heated air to flow through the bottom member 76 and roasting chamber base 82 and into the roasting chamber 16. The motor and afterburner assembly 20 includes an afterburner intake member 104 with a plurality of slotted openings 106 extending therethrough for allowing exhaust gases and smoke to flow into the afterburner assembly 134. The top member 78 includes a circular opening 112 with a flange 114 and an upper portion 146, the upper portion 146 having a plurality of notches 108 formed therein for supporting a chaff collection member 110.

FIG. 4 illustrates the bottom of the roasting apparatus 10 with the bottom cover 46 removed. The bottom portion 40 of the base 14 includes an open cavity 44 formed therein for housing a blower assembly 116, a drive assembly 90, a roasting chamber heating assembly 32, FIG. 7, and the digital control assembly 50. The drive assembly 90 includes a first drive shaft 92 extending downwardly from the motor 24, FIG. 7, a drive pulley 94 attached to the end of the drive shaft 92, a drive belt 96 coupled between the drive pulley 94 and a driven pulley 98, the driven pulley 98 attached to a shaft 100 for rotating the auger 26 within the roasting chamber 16. A bearing plate assembly 102 is attached to the top portion 38 of the base 14 to separate the drive assembly 90 from the blower assembly 116 and the roasting chamber heating assembly 32.

Referring next to FIG. 6, a cross-sectional view of the roasting apparatus 10 is shown illustrating the base 14, roasting assembly 22, motor and afterburner assembly 20, and top cover assembly 18. Located within the open cavity 44 of the base 14 are the digital control assembly 50, the drive assembly 90, the blower assembly 116, the roasting chamber heating assembly 32, and a strain relief 120. The digital control assembly 50 includes a printed circuit board 52 with a plurality of electronic components 54 mounted thereon and a control panel 56 electrically coupled to the printed circuit board 52 and mounted on the front sidewall 42 of the base 14. The roasting assembly 22 and motor and afterburner assembly 20 are attached to the top of the base 14. The top cover assembly 18 includes an open channel 122 formed between an upper heat shield 128 and a lower heat shield 130 for allowing exhaust gases and smoke to flow from the roasting chamber 16 into the afterburner intake member 104 of the afterburner assembly 134.

FIG. 7 is a cross-sectional view of the apparatus 10, which best illustrates the components, structure and operation of the roasting apparatus 10. The apparatus 10 is preferably powered by plugging the apparatus into a 120V AC electrical outlet, but may also be powered by batteries or other type of power supply. As is best shown in FIG. 7, the apparatus 10 includes a base 14, a motor and afterburner assembly 20 attached to the top of the base 14 on one side thereof, a roasting assembly 22 attached to the top of the base 14 on the other side thereof, and a top cover assembly 18 removably attached to the tops of the motor and afterburner assembly 20, and the roasting assembly 22.

The top cover assembly 18 includes a frame 148 having a top surface 150 with a sidewall 152 extending downwardly therefrom, an upper heat shield 128 and a lower heat shield 130 attached to the sidewall 152 of the frame 148. The upper and lower heat shields 128, 130 form an open channel 122 for allowing exhaust gases and smoke to flow from the roasting chamber 16 into the afterburner intake member 104 of the afterburner assembly 134. Formed within the lower heat shield 130 are a first circular opening 154 having an afterburner seal 126 attached to the perimeter of the first opening 154 for sealing around the afterburner intake member 104 and a second circular opening 156 having a roasting chamber seal 142 attached to the perimeter of the second opening 156 for sealing around the flange 114 and upper portion 146 of the top member 78 attached to the top of the sidewall 74 of the roasting chamber 16. A fine filter screen 144 is coupled to the roasting chamber seal 142 and lower heat shield 130 for filtering out chaff from the roasting process. The filter screen 144 preferably filters out chaff and allows the chaff to fall into the chaff collection member 110 positioned on the upper portion 146 on the top member 78 of the roasting chamber 16.

The motor and afterburner assembly 20 preferably includes an exterior sidewall 124 enclosing the assembly with an afterburner assembly 134 on the upper portion thereof and a motor assembly 132 on the lower portion thereof. The afterburner assembly 134 preferably includes an afterburner intake member 104, an catalyst heating element 136 positioned below the afterburner intake member 104, a catalyst 138 positioned under the catalyst heating element 136, and a catalyst heat shield 140 surrounding the catalyst 138. The afterburner intake member 104 includes a plurality of slotted openings 106 extending therethrough for allowing exhaust gases and smoke to flow into the afterburner assembly 134 from the roasting assembly 22 through open channel 122 in the top cover 18.

The motor assembly 132 includes an electric motor 24 for driving an auger 26 positioned within the roasting chamber 16 of the roasting assembly 22, and for driving a blower 28 and fan 30 that provide airflow through the roasting apparatus 10. The motor 24 includes a first drive shaft 92 extending downwardly from the motor 24 for driving a blower assembly 116 and a drive assembly 90, and a second drive shaft 158 extending upwardly from the motor 24 for driving the fan 30. Attached to the end of the first drive shaft is the blower 28 and a drive pulley 94 with a drive belt 96 coupled between the drive pulley 94 and a driven pulley 98. The driven pulley 98 is attached to a shaft 100 for rotating the auger 26 within the roasting chamber 16.

The base 14 includes a top portion 38 and a bottom portion 40 with a sidewall 42 extending downwardly from the top portion 38 to the bottom portion 40 creating an open cavity 44 within the underside of the base 14. A bottom cover 46 is preferably fastened to the bottom portion 40 of the base 14 with a plurality of fasteners. Attached to the bottom cover 46 are a plurality of non-slip feet 48 extending downwardly therefrom for allowing airflow under the base 14 and up through openings 160 in the bottom cover 46. Located within the open cavity 44 is a blower assembly 116, a drive assembly 90, a roasting chamber heating assembly 32 and the digital control assembly 50. A bearing plate assembly 102 is attached to the top portion 38 of the base 14 to separate the drive assembly 90 from the blower assembly 116 and the roasting chamber heating assembly 32.

The roasting assembly 22 preferably includes a roasting chamber heating assembly 32 positioned within the base 14 under the roasting chamber 16, a locator ring 34 attached to the top of the base 14 above the roasting chamber heating assembly 32 for securing the removable roasting chamber 16 on the roasting chamber heating assembly 32, and a chaff collection assembly 36 positioned on top of the roasting chamber 16.

The roasting chamber 16 preferably includes a transparent cylindrically-shaped sidewall 74 with a cylindrically-shaped bottom member 76 attached to the bottom of the sidewall 74, a cylindrically-shaped top member 78 attached to the top of the sidewall 74, and a handle 80 attached to the sidewall 74 and bottom member 76 for removing and replacing the roasting chamber 16 within the locator ring 34 attached to the top of the roasting chamber heating assembly 32. The bottom member 76 includes a roasting chamber base 82 with a plurality of slotted openings 84 extending therethrough for allowing heated air to flow into the roasting chamber 16. The bottom member 76 and roasting chamber base 82 include openings 86 extending through the center thereof for accepting the shaft 100 coupled to driven pulley 98 and connecting to a coupling 88 for mounting the auger 26 thereto. The top of the roasting chamber heating assembly 32 also includes a plurality of slotted openings 118 extending therethrough for allowing heated air to flow through the bottom member 76 and roasting chamber base 82 and into the roasting chamber 16. The top member 78 includes a circular opening 112 with a flange 114 and an upper portion 146, the upper portion 146 having a plurality of notches 108 formed therein for supporting the chaff collection member 110.

Operation of the roasting assembly 10 begins by adding raw green coffee beans to the roasting chamber 16 and beginning the roasting cycle by pushing the ROAST push button and selecting a roasting time. The roasting apparatus 10 will roast approximately 5 to 6 ounces of raw green coffee beans for approximately 15 to 25 minutes at a temperature between 500 and 700 degrees Fahrenheit. The roasting cycle begins by heating and agitating the beans. The beans outer skin cracks and sheds creating chaff and the beans caramelize and turn dark brown as the oils are burned and the beans are roasted. The ROAST push button 58 turns on the roasting apparatus 10 and initiates the roasting cycle. During the 15 to 25 minute roasting cycle, the motor 24, auger 26, heating elements 164, 136, fan 30, blower 28, and catalyst 138 are all on. The fan 30 and blower 28 run at a lower RPM (obtained when the power to the motor reduced to approximately 60VDC). After the roasting cycle, a cool down cycle begins. The cool down cycle lasts for final five (5) minutes of roasting cycle. During first two (2) minutes, the roasting heating element 164 is turned off, the catalyst heating element 136 remains on, and the auger 26, fan 30 and blower 28 RPM increases to a high RPM (when motor 24 is supplied with 120VDC). During last three (3) minutes, the catalyst-heating element 136 is turned off while the fan 30 continues at a high RPM.

During the roasting cycle, the electric motor 24 rotates blower 28 to draw air through air intake openings 160 in the bottom cover 46 as indicated by arrows 162. The pressurized air 166 is ducted to roasting chamber heating assembly 32, where it is heated by roasting heating element 164. The heated air exits the top of the roasting chamber heating assembly 32 and is forced through openings 84, 118 in bottom member 76 and roasting chamber base 82 into the roasting chamber 16, as indicated by arrows 168. In the roasting chamber 16 heated air passes between the coffee beans, thereby transferring heat from the air to the beans.

Because the heated air stream 168 is too slow to lift and agitate the beans, even heating of beans is assured by the constant rotation of auger 26. The beans are continuously fed to the base of the auger 26 by gravity and the large radius of roasting chamber base 82. As the beans are pushed to the base of the auger 26 by the weight of the beans above, they are lifted by the rotating auger 26 until they reach the top of the column of beans. Upon reaching the top of the column of beans, the auger 26 spills the lifted beans on top of the pile, whereupon gravity eventually returns the beans down the inner surface of roasting chamber 16 to be fed again into the base of the auger 26.

Air exiting the roasting chamber 16 passes around the chaff collection member 110 and enters a space 170 between chaff collection member 110 and a fine filter screen 144. As the air rises above the chaff collection member 110, a pressure drop is generated which causes most of the chaff and dust to fall into the chaff collection member 110. As air passes through the fine filter screen 144, it is conveyed by the open channel 122 in the top cover 18 to the afterburner assembly 134. The air is forced through the slotted openings 106 in the afterburner intake member 104 and through a catalyst heating element 136, where the temperature is raised to over 600 degrees Fahrenheit. This heated air stream 172 is then directed downward through a catalyst 138 where a catalytic reaction occurs between the particulates and smoke carried in the exhaust gases and the treated surface of the catalyst 138, thereby breaking down these odiferous materials to their odorless constituent components.

Upon exiting catalyst 138, the superheated air stream 174 is deflected upward by airflow 176, which originates from airflow 178 drawn through intake openings 180 in the sidewall 124 and driven upward by fan 30 through openings 184 in the catalyst heat shield 140. As air streams 176 and 174 mix, they form air streams 186, which exit out openings 184, 180 in the catalyst heat shield 140 and sidewall 124 and into the environment. A second flow of cooling air 182 is also driven by fan 30 upwardly between the catalyst heat shield 140 and exterior sidewall 124. This flow of air 182 cools the catalyst heat shield 140 and exterior sidewall 124, thereby keeping the temperature of the exterior of the apparatus 10 within acceptable limits for user safety and material temperatures.

When the roasting process achieves the desired degree of roast, the control circuit cuts power to the roasting heating element 164 and increases the voltage supplied to motor 24, thereby increasing the motor RPM and consequently the volume of air stream 166, to initiate the cooling process. Electrical power is continued to the catalyst heating element 136 to assure that escaping gases are successfully burned off until the roasted beans are cool enough to stop emitting exhaust gases and smoke. After a suitable cooling period has elapsed, typically two to three minutes, electrical power is cut to the catalyst heating element 136 while the accelerated cooling air stream 166 is continued for two to five more minutes to insure that all beans and mechanical components have adequately cooled before power is cut to motor 24 and the contents of the roasting chamber 16 are emptied.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A roasting apparatus comprising:
    a base having a top portion, a bottom portion and sidewall extending downwardly from the top portion to the bottom portion creating an open cavity therein;
    a motor and afterburner assembly attached to the top of the base on one side thereof;
    a roasting assembly attached to the top of the base on the other side thereof; and
    a top cover assembly removably attached to the tops of the motor and afterburner assembly and the roasting assembly.

2. The roasting apparatus of claim 1 further comprising a blower assembly mounted within the open cavity of the base and coupled to a first drive shaft of a motor for providing airflow through the roasting assembly.

3. The roasting apparatus of claim 2 further comprising a drive assembly mounted within the open cavity of the base and coupled to the first drive shaft of the motor for driving an auger within a roasting chamber of the roasting assembly.

4. The roasting apparatus of claim 3 further comprising a roasting chamber heating assembly mounted within the open cavity of the base for heating the airflow from the blower assembly prior to entering the roasting chamber.

5. The roasting apparatus of claim 1 further comprising a digital control assembly for controlling operation of the roasting apparatus.

6. The roasting apparatus of claim 3 wherein the motor is mounted within the motor and afterburner assembly and includes a second drive shaft opposite the first drive shaft, the second drive shaft coupled to a fan for providing airflow up through the afterburner assembly.

7. The roasting apparatus of claim 6 wherein the afterburner assembly further includes an afterburner intake member for receiving exhaust gases from the roasting assembly, a catalyst heating element for heating the exhaust gases before entering a catalyst, and a catalyst heat shield surrounding the catalyst.

8. The roasting apparatus of claim 3 wherein the roasting assembly includes a roasting chamber heating assembly mounted within the base for heating airflow from the blower assembly prior to entering the roasting chamber, a removable roasting chamber with a rotatable auger mounted therein, and a chaff collection assembly positioned on top of the roasting chamber.

9. The roasting apparatus of claim 1 wherein the removable top cover assembly includes an open channel formed between an upper heat shield and a lower heat shield for allowing exhaust gases and smoke to flow from the roasting chamber to the afterburner assembly.

10. The roasting apparatus of claim 9 wherein the removable top cover assembly further includes a filter for filtering out dust and chaff from the exhaust gases emanating from the roasting chamber and depositing chaff into a chaff collection member positioned on top of the roasting chamber.

11. The roasting apparatus of claim 5 wherein the digital control assembly controls operation of a roasting cycle and a cool down cycle.

12. A roasting apparatus for roasting granular material that significantly reduces eliminates exhaust gases and eliminates odors generated during a roasting process, the apparatus comprising:
   a base with a top having a first side and a second side;
   a motor and afterburner assembly attached to the top of the base on the first side thereof;
   a roasting assembly attached to the top of the base on the second side thereof; and
   a top cover assembly removably attached to the tops of the motor and afterburner assembly and the roasting assembly.

13. The roasting apparatus of claim 12 wherein the afterburner and motor assembly includes a motor for driving a blower assembly, a drive assembly and a fan.

14. The roasting apparatus of claim 13 wherein the blower assembly provides airflow through the roasting assembly.

15. The roasting apparatus of claim 13 wherein the fan provides airflow up through the afterburner assembly.

16. The roasting apparatus of claim 13 wherein the roasting assembly includes a first heating element and a plurality of slotted openings extending therethrough for providing heated airflow from the blower assembly into a roasting chamber of the roasting assembly.

17. The roasting apparatus of claim 16 wherein the roasting chamber includes an auger driven by the drive assembly for mixing the granular material.

18. The roasting apparatus of claim 16 wherein the roasting assembly further includes a chaff collection assembly and a filter for filtering out dust and chaff from the exhaust gases emanating from the roasting chamber.

19. The roasting apparatus of claim 13 wherein the afterburner and motor assembly further includes an afterburner intake member, a second heating element for increasing the temperature of the exhaust gases from the roasting chamber, a catalyst for burning off particulates, smoke, oils and other materials in the exhaust gases, and a catalyst heat shield, wherein the afterburner intake member includes a plurality of slotted openings extending therethrough for allowing the exhaust gases to flow through the second heating element and into the catalyst.

20. A method of roasting granular material comprising nuts, cocoa beans, and coffee beans, the method comprising the steps of:
   adding raw granular material to a roasting chamber of a roasting apparatus;
   providing heated airflow into the roasting chamber and mechanically mixing the granular material during a roasting cycle;
   allowing exhaust gases from the roasting process to flow from the roasting chamber to an afterburner assembly;
   filtering chaff and dust particles from the roasting chamber exhaust gases;
   heating the exhaust gases further in the afterburner assembly prior to entering a catalyst; and
   cooling the roasted granular material and exhaust gases during a cool down cycle.

* * * * *